(12) United States Patent
Martin et al.

(10) Patent No.: US 9,764,491 B2
(45) Date of Patent: Sep. 19, 2017

(54) APPARATUS AND METHOD FOR CUTTING PRODUCTS, AND REDUCED-SIZE PRODUCTS FORMED THEREWITH

(71) Applicant: Urschel Laboratories, Inc., Chesterton, IN (US)

(72) Inventors: Mark Allen Martin, Kouts, IN (US); Thomas R. Mahaffey, II, Francesville, IN (US)

(73) Assignee: Urschel Laboratories, Inc., Chesterton, IN (US)

(*) Notice: Subject to any disclaimer, the term of this patent is extended or adjusted under 35 U.S.C. 154(b) by 0 days.

(21) Appl. No.: 14/995,371

(22) Filed: Jan. 14, 2016

(65) Prior Publication Data

US 2016/0207213 A1 Jul. 21, 2016

Related U.S. Application Data

(60) Provisional application No. 62/103,864, filed on Jan. 15, 2015.

(51) Int. Cl.
| | |
|---|---|
| *B26D 7/06* | (2006.01) |
| *B26D 3/00* | (2006.01) |
| *B26D 1/03* | (2006.01) |
| *A23L 19/12* | (2016.01) |

(52) U.S. Cl.
CPC ............ *B26D 7/0691* (2013.01); *A23L 19/12* (2016.08); *B26D 1/03* (2013.01)

(58) Field of Classification Search
CPC .......... B26D 7/0691; B26D 1/03; A23L 19/12
USPC ................. 83/39, 698.11, 932, 403, 856
See application file for complete search history.

(56) References Cited

U.S. PATENT DOCUMENTS

| | | | | |
|---|---|---|---|---|
| 2,004,548 | A * | 6/1935 | Abbott ................... | B26D 1/553 83/404.3 |
| 3,472,297 | A | 10/1969 | Urschel et al. | |
| 3,521,688 | A | 7/1970 | Urschel et al. | |
| 4,206,671 | A * | 6/1980 | Hoehn ..................... | B26D 1/02 198/676 |
| 4,219,575 | A | 8/1980 | Saunders et al. | |
| 4,601,227 | A | 7/1986 | Fitzwater et al. | |
| 2002/0144584 | A1* | 10/2002 | Arrasmith ................ | B26D 1/02 83/663 |
| 2004/0079211 | A1 | 4/2004 | Walker et al. | |

(Continued)

*Primary Examiner* — Omar Flores Sanchez
(74) *Attorney, Agent, or Firm* — Hartman Global IP Law; Gary M. Hartman; Domenica N. S. Hartman

(57) ABSTRACT

An apparatus and method suitable for performing cutting operations on a product to yield a reduced-size product, for example, slicing, strip-cutting, dicing, shredding, and/or granulating a food product. The apparatus includes a casing, an impeller adapted for rotation within the casing about an axis thereof, and knives that perform, in sequence, slicing, strip-cutting and crosscutting on a product to produce reduced-size products. The apparatus is capable of performing a method by which a product is introduced into the impeller and the impeller is rotated to slice the product with a slicing knife and produce therefrom slices having peaks and valleys on opposite surfaces thereof and a cross-sectional shape that periodically varies in thickness. Strips are then produced from each of the slices by forming parallel cuts, each coinciding with a peak of each slice so that each strip has a width substantially identical to a wavelength of the slice.

18 Claims, 4 Drawing Sheets

(56) References Cited

U.S. PATENT DOCUMENTS

2010/0119678 A1* 5/2010 Sammel ............ A22C 17/0033
426/518
2013/0276604 A1 10/2013 King et al.

* cited by examiner

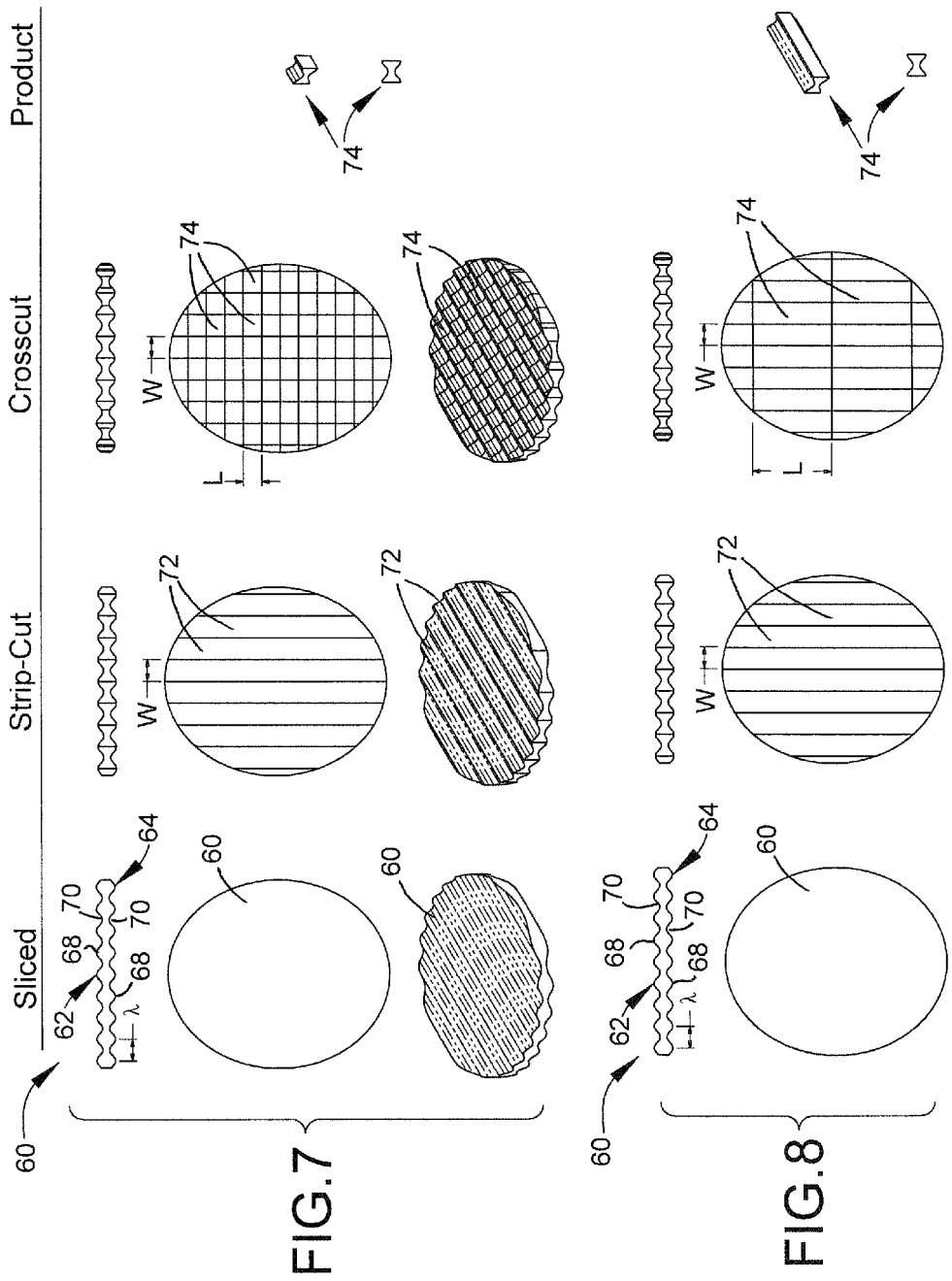

APPARATUS AND METHOD FOR CUTTING PRODUCTS, AND REDUCED-SIZE PRODUCTS FORMED THEREWITH

CROSS REFERENCE TO RELATED APPLICATIONS

This application claims the benefit of U.S. Provisional Application No. 62/103,864, filed Jan. 15, 2015 the contents of which are incorporated herein by reference.

BACKGROUND OF THE INVENTION

The present invention generally relates to methods and equipment for performing size reduction operations on products, including but not limited to food products.

Various types of equipment are known for reducing the size of products, for example, slicing, strip-cutting, dicing, shredding, and/or granulating food products. A particular example is the DiversaCut 2110® manufactured by Urschel Laboratories, aspects of which are disclosed in patent documents including U.S. Pat. Nos. 3,472,297 and 3,521,688. The DiversaCut 2110® is adapted to uniformly slice, strip-cut, and/or dice a wide variety of vegetables, fruits, and meat products at high production capacities.

A portion of a DiversaCut machine is depicted in FIG. 1 as an apparatus 10 comprising a casing (or cutting head) 12 that encloses an impeller 14. Food product 16 is delivered through a feed hopper (not shown) to the impeller 14 as the impeller 14 rotates on a horizontal axis within the casing 12. Centrifugal force holds the product 16 against the inner wall of the casing 12 as paddles 20 of the impeller 14 carry the product 16 past a slicing knife 22 mounted on the casing 12 and oriented roughly parallel to the axis of the impeller 14. An adjustable slice gate 21 located upstream of the slicing knife 22 allows the product 16 to move outward across the edge of the knife 22 to produce a single slice 26 from each individual product 16 with each rotation of the impeller 14. The thickness of each slice 26 is determined by the distance between the cutting edge of the slicing knife 22 and the adjacent edge of the slice gate 21. In the embodiment shown, the slices 26 enter circular knives 24 as they radially emerge from the slicing knife 22, with the result that the slices 26 are cut into strips 27 as the slices 26 continue to travel under the momentum originally induced by the impeller 14. The strips 27 then pass directly into a rotating knife assembly 28 equipped with crosscut knives 29 that make a transverse cut to produce a reduced-size product 30 (e.g., diced), which is then discharged from the apparatus 10 through a discharge chute 32.

As evident from FIG. 1, the circular and crosscut knives 24 and 29 are located outside the casing 12, and therefore engage the food product 16 after slices 26 cut from the product 16 have been produced by the slicing knife 22. The slices 26, strips 27, and final diced product 30 are all examples of reduced-size products that can be produced with a DiversaCut machine of the type represented by the apparatus 10 depicted in FIG. 1.

Although the above-described methods and equipment are useful for many size reduction applications, there is an ongoing desire to provide new methods and equipment for performing size reduction operations on products, including but not limited to food products, that result in food product slices having unique shapes.

BRIEF DESCRIPTION OF THE INVENTION

The present invention provides an apparatus and method suitable for performing cutting operations on a product to yield a reduced-size product, for example, slicing, strip-cutting, dicing, shredding, and/or granulating a food product.

According to one aspect of the invention, the apparatus includes a casing, an impeller adapted for rotation within the casing about an axis thereof, and knives that perform, in sequence, slicing, strip-cutting and crosscutting on a product to produce reduced-size products. The casing comprises a circumferential wall, a circumferential opening in the wall, an adjustable slice gate that partially closes the opening, and a slicing knife that defines a gate opening with the slice gate. A width of the gate opening is adjustable by positioning the slice gate relative to the casing. The slicing knife is oriented parallel to an axis of the casing. The slicing knife, an interior surface of the wall, and an interior surface of the slice gate each define a periodic pattern of rounded peaks and valleys wherein the periodic shapes of the interior surfaces of the casing and the slice gate are aligned with each other, and the periodic shape of the slicing knife is shifted so that each peak of the slicing knife opposes a corresponding peak of the surface of the slice gate and the width of the gate opening periodically varies between a minimum gap defined by the distance between opposing peaks of the slice knife and the surface of the slice gate, and a maximum gap defined by the distance between opposing valleys of the slice knife and the surface of the slice gate. The impeller is adapted to cause products within the impeller to be held by centrifugal force against the wall of the casing, carried past the slicing knife, and produce a single slice from each individual product with each rotation of the impeller. Each slice has a cross-sectional shape periodically varying in thickness consistent with the width of the gate opening to have parallel peaks and valleys and each sliced product has a wavelength as measured from peak-to-peak at oppositely-disposed surfaces of the slice. Circular knives are adapted to produce strips from each slice by forming parallel cuts with each parallel cut coinciding with a peak of the slice so that each strip has a width substantially identical to the wavelength of the slice from which the strip is produced. Crosscut knives are adapted to produce reduced-size products from each strip by forming parallel cuts with each parallel cut being transverse to the peaks of the slice and perpendicular to the parallel cuts formed by the circular knives so that each reduced-size product retains the width of the strip from which the reduced-size product was produced and has a length determined by the crosscut knives.

According to another aspect of the invention, the method includes introducing a product into an impeller, rotating the impeller to slice the product with a slicing knife and produce therefrom slices having peaks and valleys on opposite surfaces thereof and a cross-sectional shape that periodically varies in thickness, producing strips from each of the slices by forming first parallel cuts wherein each of the first parallel cuts coincides with a peak of the slice so that each strip has a width substantially identical to a wavelength of the slice from which the strip is produced, and producing reduced-size products from each of the strips by forming second parallel cuts that are transverse to the peaks of the slice and perpendicular to the first parallel cuts that formed the strips so that each reduced-size product retains the width of the strip from which the reduced-size product was produced and has a length determined by the second parallel cuts.

Additional aspects of the invention include the resulting reduced-size products.

Other aspects and advantages of this invention will be better appreciated from the following detailed description.

BRIEF DESCRIPTION OF THE DRAWINGS

FIGS. 7 and 8 represent side, plan, and perspective views corresponding to three stages of a product that has undergone slicing, strip-cutting, and crosscutting to yield two different reduced-size products in accordance with nonlimiting embodiments of this invention.

DETAILED DESCRIPTION OF THE INVENTION

Figure 1:
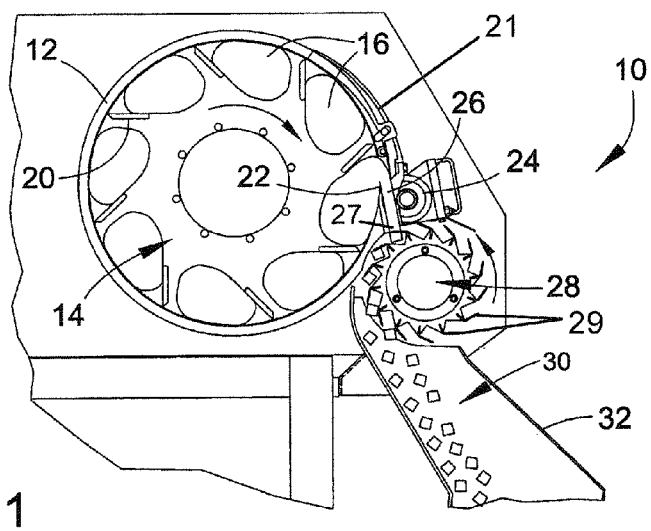
FIG. 1 is a fragmentary view of a machine adapted to perform cutting operations on a product to yield a reduced-size product, for example, sliced, strip-cut, and crosscut (e.g., dicing, shredding, or granulating) food products.
Figure 2:
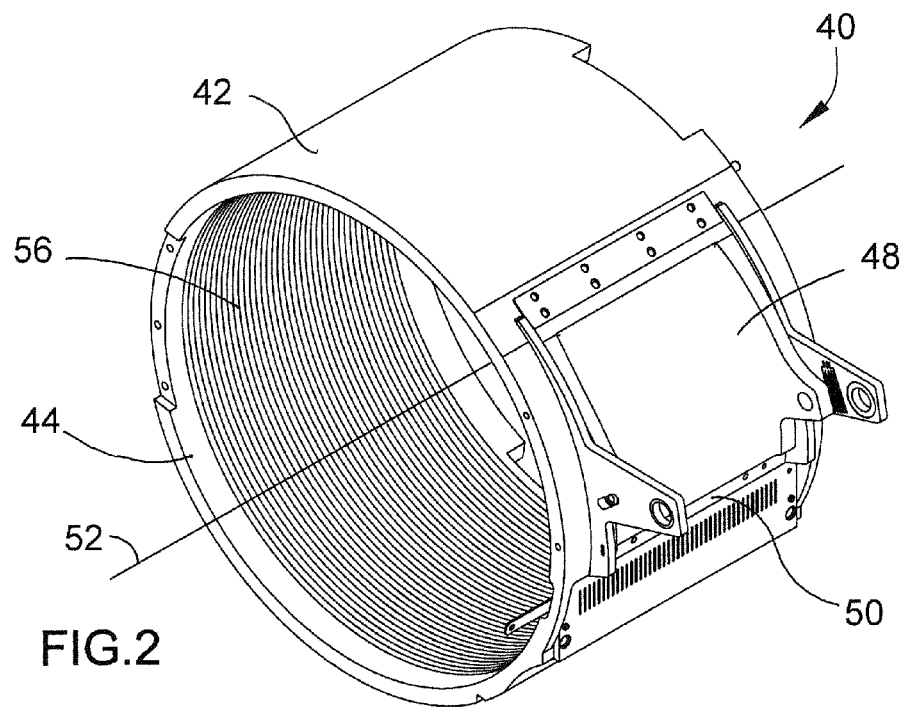
FIG. 2 is a perspective view of a casing suitable for use with the machine of FIG. 1 and adapted for slicing products in accordance with nonlimiting embodiments of this invention.
Figure 3:
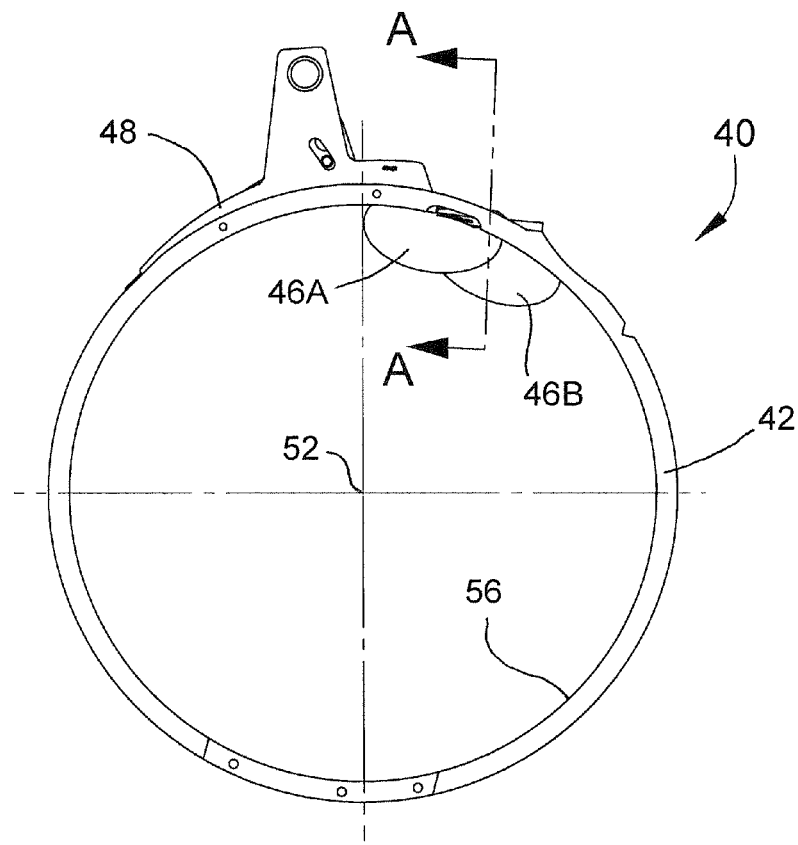
FIG. 3 is a side view of the casing of FIG. 2 and represents one product undergoing slicing and a second product immediately after undergoing slicing.

FIGS. 2 and 3 depict a casing (cutting head) 40 in accordance with a nonlimiting embodiment of the present invention. The casing 40 is configured for operation with an impeller, for example, the impeller 14 of FIG. 1, adapted to rotate within the casing 40 as discussed above in reference to FIG. 1. The casing 40 will be described in reference to the apparatus 10 of FIG. 1, including its use in combination with the impeller 14 of FIG. 1, though it should be understood that the casing 40 can be adapted for use in size-reduction machines other than the DiversaCut 2110® machine represented in FIG. 1. Nonlimiting examples include other machines within the family of DiversaCut machines (e.g., DC2110A, Sprint, Sprint 2), as well as Urschel Model Q machines. Because aspects of the impeller 14 used with the casing 40 can be consistent with what is represented in FIG. 1, the impeller 14 is not shown in FIG. 2 or 3.

Similar to the casing 12 of FIG. 1, the casing 40 shown in FIGS. 2 and 3 is a stationary annular-shaped housing for the impeller 14, which when installed in the casing 40 is enclosed and coaxially mounted for rotation within the casing 40 as shown in FIG. 1. In the view represented in FIG. 3, the impeller 14 would rotate clockwise, and relative locations of various components of the casing 40 will be described as "upstream" and "downstream" based on the clockwise movement of products (46A and 46B in FIGS. 3 through 5) within the casing 40 under the influence of the impeller 14 and its paddles 20. With this arrangement, as the impeller 14 rotates in a clockwise direction, pockets defined by and between adjacent pairs of paddles 20 capture products introduced into the impeller 14 through an open axial end 44 of the casing 40, for example, with a feed hopper (not shown), and centrifugal forces produced by rotation of the impeller 14 cause the products to be urged radially outward into engagement with a circumferential wall 42 of the casing 40.

The circumferential wall 42 of the casing 40 has a circumferential opening that is partially closed by an adjustable slice gate 48 mounted to the casing 40. The paddles 20 of the impeller 14 carry the products 46A and 46B past a slicing knife 50 mounted at the downstream edge of the circumferential opening of the casing 40. As evident from FIG. 2, the slicing knife 50 is oriented roughly parallel to a horizontal axis 52 that is common to the impeller 14 and casing 40. The adjustable slice gate 48, located upstream of the slicing knife 50, allows the products 46A and 46B to move outward across an upstream cutting edge of the knife 50 to produce a single slice from each individual product 46A/B with each rotation of the impeller 14. FIG. 3 represents both products 46A and 46B as being captured within a single pocket between adjacent paddles 20 (now shown), but with one of the products 46B being slightly ahead (upstream) of the other product 46A, such that the product 46B has already passed the slicing knife 50 while the other product 46A is still undergoing slicing by the knife 50.

The gate 48 and slicing knife 50 define a gate opening 54 (FIGS. 4 and 5) of the casing 40, and the width of the gate opening 54 can be adjusted by repositioning the gate 48 relative to the casing 40, for example, by pivoting the gate 48 toward and away from the casing 40. Furthermore, the thickness of each slice is determined by the gate opening 54, and more particularly the distance between the slicing knife 48 and the adjacent downstream edge of the slice gate 48.

As described in reference to FIG. 1, after exiting the casing 40, each slice enters the circular knives 24 as it emerges from the gate opening 54, with the result that the slices are subsequently cut into strips as the slices continue to travel under the momentum originally induced by the impeller 14. The strips then pass directly into the rotating knife assembly 28, whose crosscut knives 29 make transverse cuts to produce a crosscut (e.g., diced) product. As these aspects are consistent with what is represented in FIG. 1, the circular knives 24 and crosscut knives 29 are not shown in FIG. 2 or 3. It should suffice to say that the circular and crosscut knives 24 and 29 are located outside the casing 12 and engage the products 46A and 46B after slices have been produced from each product 46A/B by the slicing knife 50. The slices, strips, and final crosscut products are all examples of reduced-size products that can be produced with the casing 40 depicted in FIGS. 2 and 3. Whether a sliced, strip-cut, or crosscut (e.g., diced, shredded, or granulated) product is desired will depend on the intended use of the product.

Figure 4:
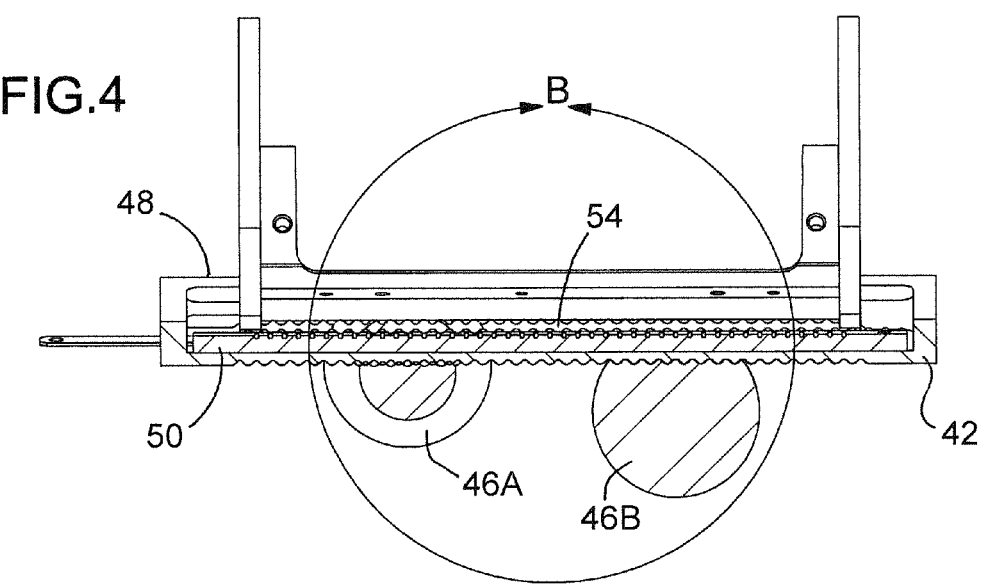
FIG. 4 is a cross-sectional view along section line A-A of FIG. 3.
Figure 5:
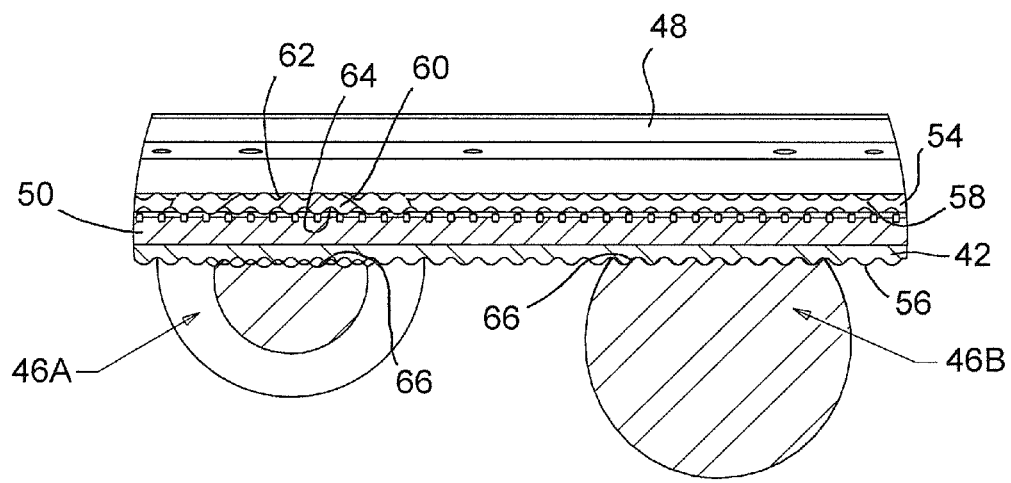
FIG. 5 is an enlarged view of detail B in FIG. 4.

As evident from FIGS. 2, 4 and 5, the slicing knife 50, the interior surface 56 of the casing wall 42, and the interior surface 58 of the gate 48 each define a periodic pattern of parallel peaks and valleys when viewed edgewise in FIGS. 4 and 5. The periodic patterns are preferably characterized by rounded peaks and valleys, corresponding to what may be termed a corrugated or sinusoidal shape. The periodic shapes of the knife 50 and surfaces 56 and 58 have substantially equal wavelengths (as measured from peak-to-peak or from valley-to-valley). As most readily apparent from FIG. 5, the periodic shapes of the surfaces 56 and 58 of the casing 40 and gate 48 are aligned with each other, whereas the periodic shape of the knife 50 is shifted so that each peak of the knife 50 opposes a corresponding peak of the gate surface 58. As a result, the width of the gate opening 54 periodically varies between a minimum gap defined by the distance between opposing peaks of the knife 50 and gate surface 58, and a maximum gap defined by the distance between opposing valleys of the knife 50 and gate surface 58.

Figure 6:
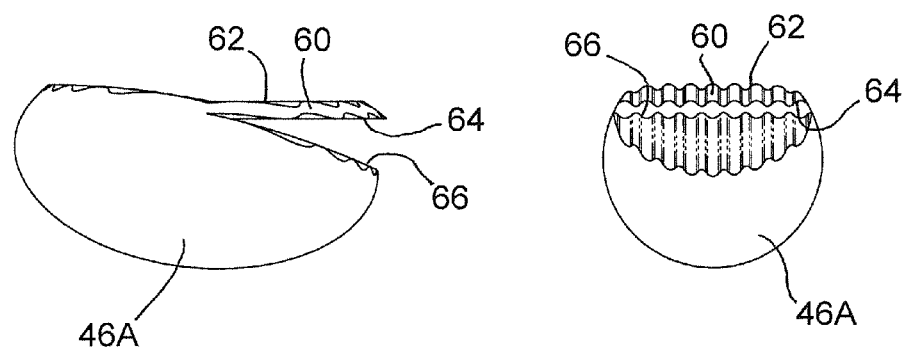
FIG. 6 represents two isolated views of the product undergoing slicing in FIGS. 3 through 5.

FIGS. 3 through 5 depict the product 46A as undergoing a slicing operation by the knife 50 and the product 46B immediately after undergoing slicing. FIG. 6 contains isolated side and end views of the product 46A, including an incomplete slice 60 as it is being generated by the slicing operation. The product 46A has a surface 62 that was generated as a result of the slicing operation performed with the knife 50 during the previous revolution of the impeller 14, and the knife 50 has two partially generated surfaces 64 and 66 as a result of the current slicing operation. It should be understood that, prior to the slicing operation, the surface 62 of the slice 60 was originally equivalent to the surface 66 of the product 46A shown in FIGS. 4, 5 and 6. The periodic shape of the knife 50 generates a corresponding periodic shape in the opposite surfaces 62 and 64 of the slice 60, and generates a corresponding periodic shape in the surface 66 of the remaining product 46A. The cross-sectional shape of the slice 60 is consistent with the shape of the gate opening 54, i.e., periodically varying in thickness. This shape is achieved as a result of the surface 56 of the casing 40 causing the products 46A and 46B to shift a distance equal to one-half wave following the slicing operation, as evident by comparing in FIG. 5 the misalignment of the surface 66 of the product 46A with the surface 56 of the casing wall 42 during the slicing operation performed on the product 46A, and the alignment of the surface 66 of the product 46B with the surface 56 of the casing wall 42 after completing the slicing operation on the product 46B. In effect, following the slicing operation, the periodic shape of the surface 56 of the casing wall 42 shifts the position of the products 46A and 46B relative to the knife 50 so that each peak on the surface 66 of each product 46A/B will be aligned with a valley of the knife 50 and each valley on the surface 66 of each product 46A/B will be aligned with a peak of the knife 50 when the product 46A/B next encounters the knife 50 following a complete revolution of the impeller 14.

FIGS. 7 and 8 represent side, plan, and perspective views corresponding to three stages of a product that has undergone slicing to yield a "Sliced" intermediate product (slices identified with the reference number 60 for consistency with FIGS. 4 and 5), and then has further undergone strip-cutting ("Strip-cut") and finally crosscutting ("Cross-cut") to yield, respectively, strips 72 and two different reduced-size products 74. Each of the intermediate slices 60 has the cross-sectional shape described above for the slice 60 described in reference to FIGS. 4 and 5, namely, a shape that periodically varies in thickness consistent with the shape of the gate opening 54. As such, the oppositely-disposed surfaces 62 and 64 of each slice 60 have parallel peaks 68 and valleys 70, and the thickness of each slice 60 periodically varies between a minimum thickness defined between oppositely-disposed valleys 70 on the surfaces 62 and 64, and a maximum thickness defined between oppositely-disposed peaks 68 on the surfaces 62 and 64. Each slice 60 has a wavelength ("A"), as measured from peak-to-peak at each surface 62 and 64 determined by the wavelength of the slicing knife 50, and the wavelength can vary depending on the desired characteristics of the final reduced-size products 74.

Each of the strips 72 represented in FIGS. 7 and 8 is produced as a result of the circular knives 24 (FIG. 1) performing parallel cuts, each cut parallel to and coinciding with a peak 68 of the slice 60 so that each strip 72 has a width ("W") substantially identical to the wavelength of the slice 60 from which the strip 72 was produced. For this purpose, the axial spacing between adjacent circular knives 24 is intentionally set to be equal to the wavelength of the periodic pattern of the slicing knife 50, and each circular knife 24 must be aligned with a valley of the slicing knife 50. At this point in the size-reduction process, the strips 72 of FIG. 7 are represented as being essentially identical to the strips 72 of FIG. 8. As evident from FIGS. 7 and 8, other than the strips 72 at the outer extremities of the slice 60, the cross-sectional shapes of the strips 72 have what may be called a "bow tie" shape.

Each of the reduced-size products 74 represented in FIGS. 7 and 8 is produced as a result of the crosscut knives 29 (FIG. 1) performing parallel cuts, each transverse to the peaks 68 of the slice and perpendicular to the parallel cuts formed by the circular knives 24, so that each reduced-size products 74 retains the width and the cross-sectional shape of the strip 72 from which it was produced. However, the cross-cuts are formed so that the reduced-size products 74 of FIG. 7 differ in length "L" from the reduced-size products 74 of FIG. 8. The lengths of the products 74 are determined by the circumferential spacing between adjacent crosscut knives 29 within the rotating knife assembly 28.

The casing 40 represented in FIGS. 2 through 5 and the process performed therewith can be adapted to cut a variety of different types of food products, including but not limited to potatoes and carrots. It is also foreseeable that the casing 40 and process could be adapted to cut products other than food products.

While the invention has been described in terms of a specific embodiment, it is apparent that other forms could be adopted by one skilled in the art. For example, the physical configuration of the casing 40, an impeller 14 used therewith, and particular components of the apparatus in which the casing 40 is used could differ from that shown, and various materials and processes could be used to manufacture the casing 40 and its components. Therefore, the scope of the invention is to be limited only by the following claims.

The invention claimed is:

1. A method of reducing the size of a product, the method comprising:
   introducing the product into an impeller within a casing having an axis;
   rotating the impeller to slice the product with a slicing knife and produce therefrom slices, wherein after encountering the slicing knife to produce a first slice each individual product shifts along the axis of the casing prior to completing a subsequent rotation and encountering the slicing knife to produce a second slice such that the second slice has peaks and valleys on opposite surfaces thereof and a cross-sectional shape that periodically varies in thickness;
   producing strips from each of the slices by forming first parallel cuts, each of the first parallel cuts coinciding with a peak of the slice so that each strip has a width substantially identical to a wavelength of the slice from which the strip is produced; and
   producing reduced-size products from each of the strips by forming second parallel cuts that are transverse to the peaks of the slice and perpendicular to the first parallel cuts that formed the strips so that each reduced-size product retains the width of the strip from which the reduced-size product was produced and has a length determined by the second parallel cuts.

2. The method according to claim 1, wherein products are food products.

3. The method according to claim 2, wherein food products are potatoes or carrots.

4. A method of reducing the size of a product, the method comprising:
   introducing the product into an impeller;
   rotating the impeller to slice the product with a slicing knife and produce therefrom slices having peaks and valleys on opposite surfaces thereof and a cross-sectional shape that periodically varies in thickness;

producing strips from each of the slices by forming first parallel cuts, each of the first parallel cuts coinciding with a peak of the slice so that each strip has a width substantially identical to a wavelength of the slice from which the strip is produced; and producing reduced-size products from each of the strips by forming second parallel cuts that are transverse to the peaks of the slice and perpendicular to the first parallel cuts that formed the strips so that each reduced-size product retains the width of the strip from which the reduced-size product was produced and has a length determined by the second parallel cuts;

wherein each of the reduced-size products has a bow tie cross-sectional shape.

5. A method of reducing the size of a product, the method comprising:

introducing the product into an impeller;

rotating the impeller to slice the product with a slicing knife and produce therefrom slices having peaks and valleys on opposite surfaces thereof and a cross-sectional shape that periodically varies in thickness;

producing strips from each of the slices by forming first parallel cuts, each of the first parallel cuts coinciding with a peak of the slice so that each strip has a width substantially identical to a wavelength of the slice from which the strip is produced;

producing reduced-size products from each of the strips by forming second parallel cuts that are transverse to the peaks of the slice and perpendicular to the first parallel cuts that formed the strips so that each reduced-size product retains the width of the strip from which the reduced-size product was produced and has a length determined by the second parallel cuts; and adjusting the circumferential spacing between adjacent pairs of the second parallel cuts to selectively determine the lengths of the reduced-size products.

6. The method according to claim 1, wherein each product is sliced during each rotation of the impeller.

7. An apparatus for cutting products, the apparatus comprising:

a casing comprising a circumferential wall, a circumferential opening in the wall, an adjustable slice gate that partially closes the opening, and a slicing knife that defines a gate opening with the slice gate, a width of the gate opening being adjustable by positioning the slice gate relative to the casing, the slicing knife being oriented parallel to an axis of the casing, the slicing knife, an interior surface of the wall, and an interior surface of the slice gate each defining a periodic pattern of rounded peaks and valleys, the periodic shapes of the interior surfaces of the casing and the slice gate being aligned with each other, the periodic shape of the slicing knife being shifted so that each peak of the slicing knife opposes a corresponding peak of the surface of the slice gate and the width of the gate opening periodically varies between a minimum gap defined by the distance between opposing peaks of the slice knife and the surface of the slice gate, and a maximum gap defined by the distance between opposing valleys of the slice knife and the surface of the slice gate;

an impeller adapted for rotation within the casing about the axis thereof to cause products within the impeller to be held by centrifugal force against the wall of the casing, carried past the slicing knife, and produce a single slice from each individual product with each rotation of the impeller, each slice having a cross-sectional shape periodically varying in thickness consistent with the width of the gate opening to have parallel peaks and valleys, each sliced product having a wavelength as measured from peak-to-peak at oppositely-disposed surfaces of the slice;

circular knives adapted to produce strips from each slice by forming parallel cuts, each parallel cut coinciding with a peak of the slice so that each strip has a width substantially identical to the wavelength of the slice from which the strip is produced; and crosscut knives adapted to produce reduced-size products from each strip by forming parallel cuts, each parallel cut being transverse to the peaks of the slice and perpendicular to the parallel cuts formed by the circular knives so that each reduced-size product retains the width of the strip from which the reduced-size product was produced and has a length determined by the crosscut knives.

8. The apparatus according to claim 7, wherein the axis of the casing is substantially horizontal.

9. The apparatus according to claim 7, wherein the slicing knife, the interior surface of the wall, and the interior surface of the slice gate are configured such that each individual product after passing the slicing knife and producing a first slice shifts along the axis of the casing prior to completing a subsequent rotation and contacting the slicing knife to produce a second slice such that the second slice has peaks and valleys on opposite surfaces thereof and a cross-sectional shape that periodically varies in thickness.

10. The apparatus according to claim 9, wherein the reduced-size products produced from the second slice has a bow tie cross-sectional shape.

11. The apparatus according to claim 7, wherein the slicing knife is the only cutting edge on the casing for producing each slice.

12. The apparatus according to claim 11, wherein the reduced-size products have a bow tie cross-sectional shape.

13. A method of reducing the size of a product using the apparatus according to claim 7, the method comprising:

introducing the product into the impeller;

rotating the impeller to slice the product with the slicing knife and produce therefrom the slices having the cross-sectional shape periodically varying in thickness;

producing the strips from each of the slices by forming the parallel cuts with the circular knives, each of the parallel cuts coinciding with a peak of the slice so that each strip has a width substantially identical to the wavelength of the slice from which the strip is produced; and producing the reduced-size products from each of the strips by forming the parallel cuts with the crosscut knives, each of the parallel cuts being transverse to the peaks of the slice and perpendicular to the parallel cuts formed by the circular knives so that each reduced-size product retains the width of the strip from which the reduced-size product was produced and has a length determined by the crosscut knives.

14. The method according to claim 13, wherein products are food products.

15. The method according to claim 14, wherein food products are potatoes or carrots.

16. The method according to claim 13, wherein each of the reduced-size products has a bow tie cross-sectional shape.

17. The method according to claim 13, further comprising adjusting the circumferential spacing between adjacent crosscut knives to selectively determine the lengths of the reduced-size products.

18. The method according to claim 13, wherein each product is sliced and each of the slices is expelled from the casing during each rotation of the impeller.

* * * * *